J. W. MARSHALL.
PULLEY ATTACHMENT DEVICE.
APPLICATION FILED FEB. 7, 1919.

1,337,249. Patented Apr. 20, 1920.

Witnesses
K. A. Thomas

Inventor
J. W. Marshall
By Victor J. Evans
Attorney

UNITED STATES PATENT OFFICE.

JOHN W. MARSHALL, OF BUTTE, MONTANA.

PULLEY-ATTACHMENT DEVICE.

1,337,249.  Specification of Letters Patent.  Patented Apr. 20, 1920.

Application filed February 7, 1919. Serial No. 275,640.

*To all whom it may concern:*

Be it known that I, JOHN W. MARSHALL, a citizen of the United States, residing at Butte, in the county of Silverbow and State of Montana, have invented new and useful Improvements in Pulley - Attachment Devices, of which the following is a specification.

This invention relates to pulleys, and more especially to means for removably securing a pulley to the driving wheel of a motor vehicle, for the purpose of utilizing the power of the latter to operate other machinery, such as a saw, pump, or the like.

Another object is to provide novel means for securing a pulley in position in a manner to distribute the strain around the felly and rim of the driving wheel and thereby avoid the danger of breaking or mutilating the spokes and permitting of the attachment of the pulley to wheels having wire spokes, while the centrifugal force of the wheel in operation tends to tighten the grip of the pulley thereon.

The invention further aims to provide a simple and quick manner of attaching a pulley to wheels of different diameters, so as to insure a proper grip upon the wheels of vehicles of various makes.

Other objects and advantages of the invention will appear as the following description is read in connection with the accompanying drawings.

In the drawings.

Referring in detail to the drawings, like characters of reference denote corresponding parts through the several views.

Figure 1:
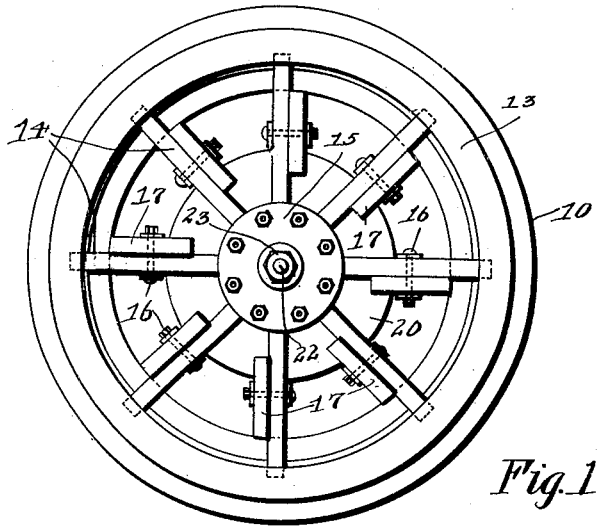
Figure 1 is a side elevation of the driving wheel of a motor vehicle, shown in elevated or jacked-up position and having the improved pulley applied thereto.

The invention is shown in the drawings as applied to the driving wheel 10 of a vehicle, the driving axle of which is shown at 11. The wheel is shown in elevated or jacked-up position, the jack being indicated at 12.

The pulley which is shown in position comprises a rim 13, which is preferably formed of laminated material and is attached by means of spokes 14 to a hub 15.

Each of the spokes is provided with an opening 15', for the passage of a bolt 16, and mounted upon these bolts are laterally extending arms 17. One end of each arm 17 is provided with an opening for the passage of a bolt 16, while the opposite end of the arm carries an outwardly extending hook 18. Formed upon the outer edge of the arms 17, adjacent the hook 18, is a seat 19, which is adapted to receive the felly of the wheel 10, so as to provide a contacting engagement between the arms and the wheel. Spaced from the hook 18 and adjustably secured to each of the arms 17 is a clamp 18', adapted for engagement with the wheel felly to clamp the arms in position.

For the purpose of holding and adjusting the arms 17 upon the wheel 10, the said arms have their opposed or inner edges inclined or tapered toward the outer ends. Positioned between the arms is a spreader in the form of a disk 20, which is provided with spaced notches 21, the latter engaging and sliding along the inclined edges of the arms 17, so as to spread the latter and hold them in engagement with the felly of the wheel 10. To effect this adjustment, the disk 20 is provided with a laterally extending bolt 22, which passes through the hub 15 of the pulley and has mounted thereon an adjusting head 23. The opposite end of the bolt 22 is provided with a swiveled head, the latter having a socket 24 therein for engagement with the wheel hub.

Figure 2:
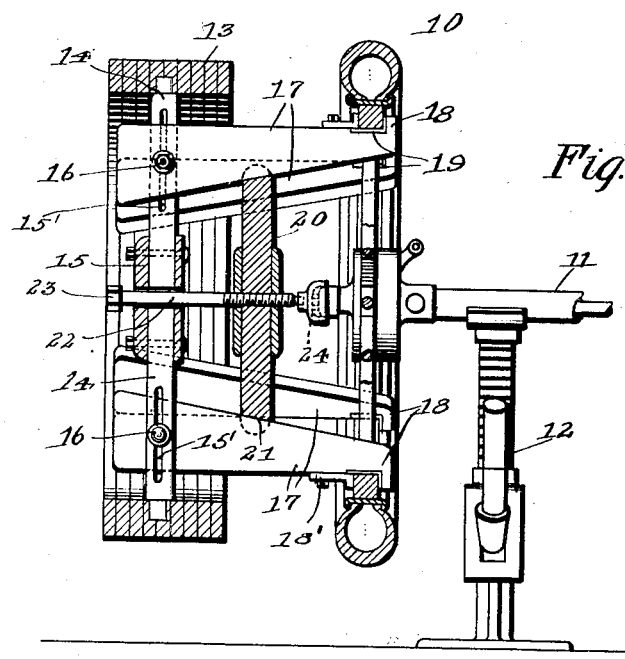
Fig. 2 is a vertical sectional view of the same.

As will be apparent from an inspection of Fig. 2, by drawing the disk 20 toward the spokes 14, the arms 17 will have their free ends spread outward for engagement with the felly of the wheel 10 and will be securely held in such engagement until released by reversed movement of the disk 20.

The invention is susceptible of various changes in its form, proportions and minor details of construction and the right is herein reserved to make such changes as properly fall within the scope of the appended claims.

Having described the invention, what is claimed is:

1. The combination with a driving wheel, of a pulley, laterally extending arms having one end secured to said pulley, means carried by opposite ends of said arms for engagement with the felly of the driving wheel and laterally movable means carried by the pulley for holding the arms in such engagement.

2. The combination with a driving wheel, of a pulley, laterally extending arms having one end secured to said pulley, hooks located at the extremities of said arms for engagement with the felly of the driving wheel and a spreading device positioned between said arms for holding the latter in such engagement.

3. The combination with a driving wheel, of a pulley, laterally extending arms having one end secured to said pulley, means carried by the opposite ends of said arms for engagement with the felly of the wheel, and a laterally movable spreading element positioned between said arms for holding the latter in such engagement.

4. The combination with a driving wheel, of a pulley, laterally extending circumferentially arranged arms having one end secured to said pulley and provided with inclined surfaces upon the inner opposed edges, means located upon the extremities of the arms for engagement with the felly of the wheel and a laterally movable spreading device positioned between said arms for holding the latter in such engagement.

5. The combination with a driving wheel, of a pulley, laterally extending circumferentially arranged arms having one end secured to said pulley and their opposed inner edges inclined to provide a tapered free end, means located at the free end of the arms for engagement with the driving wheel and a laterally movable spreading device for holding the arms in such engagement.

6. The combination with a driving wheel, of a pulley, laterally extending circumferentially arranged arms having one end secured to said pulley and their opposed edges inclined to provide a tapered free end, means located at the free end of the arms for engagement with the driving wheel and a concentrically arranged lateral movable disk positioned between said arms for holding the latter in such engagement.

7. The combination with a driving wheel, of a pulley, laterally extending circumferentially arranged arms having one end secured to said pulley and their opposed edges inclined to provide a tapered free end, means located at the free end of the arms for engagement with the driving wheel, and a concentrically arranged disk positioned between said arms and means extending through the center of the pulley for moving the disk laterally to spread the arms.

In testimony whereof I affix my signature.

JOHN W. MARSHALL.